Jan. 3, 1956
H. L. WILLEY
2,729,156
TRACTOR LINKAGE
Filed Dec. 8, 1951
2 Sheets-Sheet 2
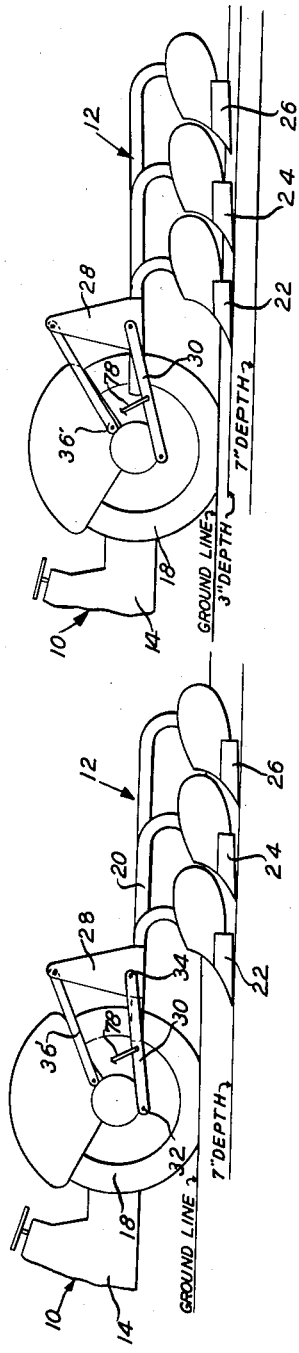
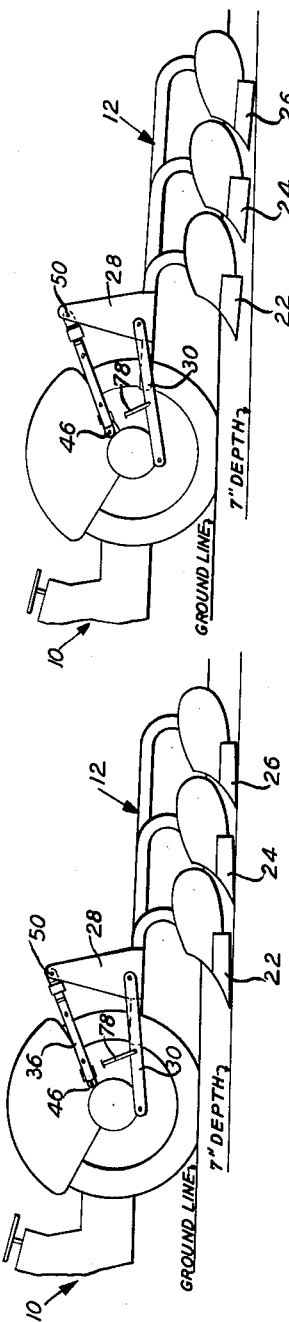
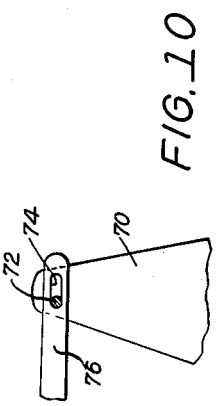
H. L. WILLEY
INVENTOR.
BY E. C. McRae
J. R. Faulkner
J. N. Oster
ATTORNEYS United States Patent Office 2,729,156
Patented Jan. 3, 1956

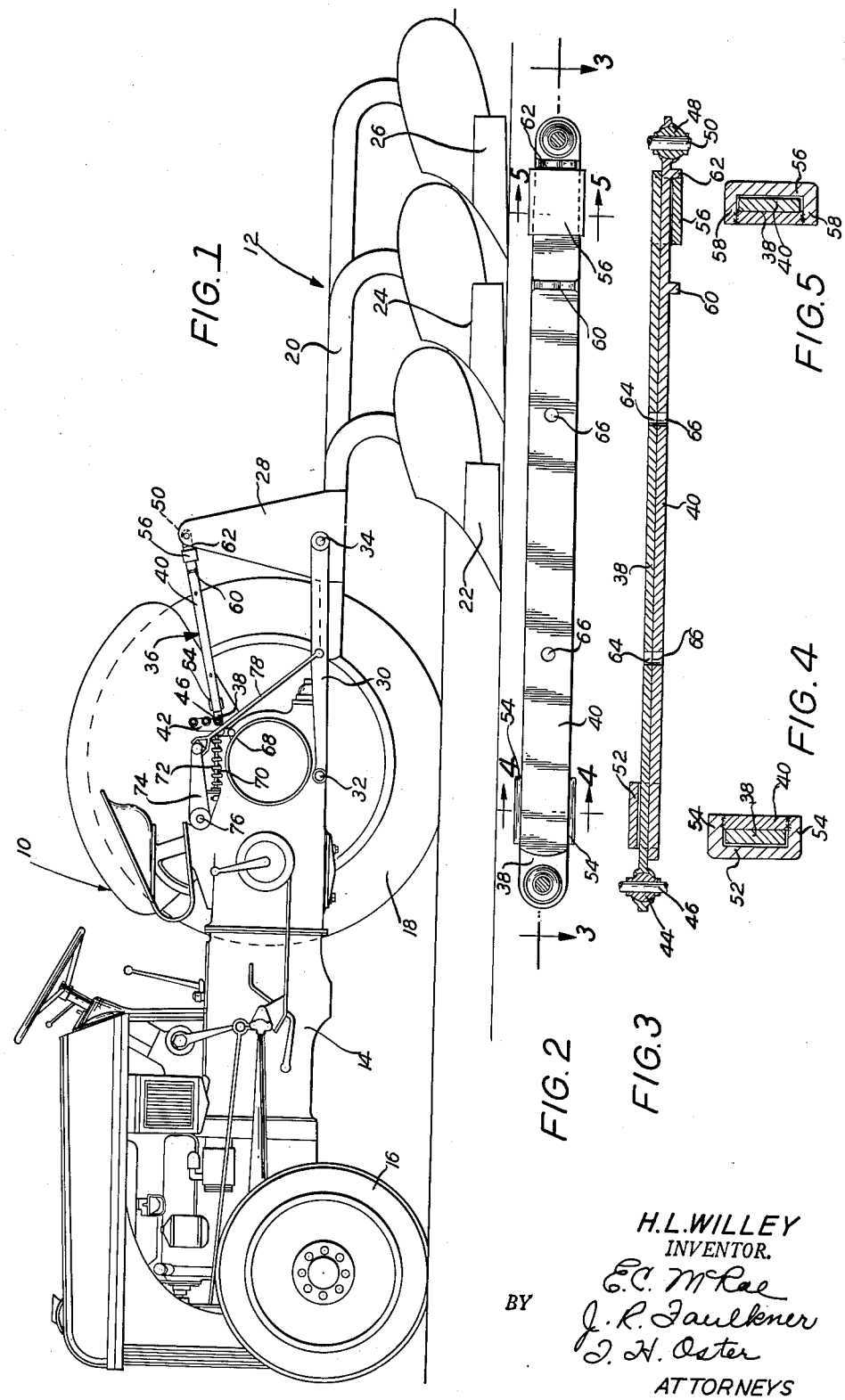

2,729,156

TRACTOR LINKAGE

Harold L. Willey, Dearborn, Mich., assignor to Ford Motor Company, Dearborn, Mich., a corporation of Delaware Application December 8, 1951, Serial No. 260,612

1 Claim. (Cl. 97—46.07)

This invention relates generally to tractors and has particular reference to the linkage used to connect an agricultural implement to a tractor, and is particularly applicable to tractors of the type employing a triangulated linkage interconnecting the implement and tractor.

Tractors of this type conventionally have a pair of lower links normally in tension and an upper link normally in compression when the implement is in engagement with the soil. The upper link is arranged to actuate control means controlling the operation of hydraulic lift mechanism for raising the implement. In usage with a soil working implement such as a two or three bottom plow, and with the plow shares normally horizontal when the plow is working at a normal depth, the raising of the plow by the hydraulic lift mechanism causes the plow shares to be inclined downwardly, increasing the suck of the plow. This causes the plow shares to tend to dig deeper into the ground thus necessitating additional lifting effort to raise the plow. The hydraulic control mechanism is thus required to lift not only the weight of the plow but also to overcome the suck of the plow resulting from this increased suck angle. This causes increased oil line pressure, momentarily retards the response of the lift action, and increases the weight transfer to the rearward portion of the tractor.

It is an object of the present invention to overcome the above mentioned disadvantages of the conventional linkage arrangement by providing an improved linkage operating in a manner similar to the conventional linkage when the implement is working at uniform depth, yet which is automatically effective when the hydraulic lift mechanism is operated to incline the plow shares upwardly to form a negative suck angle or positive raising angle tending to raise the shares from the ground. In one embodiment of the invention this is accomplished by providing an extensible upper link assembly formed of two telescopically arranged links, one pivotally connected to the tractor and the other pivotally connected to the plow, and provided with stop means limiting the extension of the link assembly to a predetermined amount and determining fixed minimum and maximum lengths for the link assembly. The two links of the upper link assembly are arranged for unrestrained sliding movement relative to each other through the predetermined range. Under normal operating conditions with the plow working at a fixed depth, the upper link assembly is contracted and operates in compression at a fixed minimum length to enable variations in the draft of the implement to be transferred to the hydraulic control mechanism as in conventional construction. When the hydraulic lift mechanism is operated to lift the implement, however, the initial lifting action causes the upper link assembly to be extended and raises the forward portion of the implement. This inclines the plow shares upwardly and they then tend to rise toward the ground line. Thus, instead of being required to lift the entire implement and to overcome an increased suck of the plow shares, the hydraulic lift mechanism is only required to lift the forward portion of the implement. Consequently a quicker response is obtained and variations in implement draft are rapidly corrected. In addition, less oil line pressure is required, and the weight transfer from the forward to the rearward portion of the tractor is minimized. Smoother and more efficient operation of the tractor and implement results.

Other objects and advantages of this invention will be made more apparent as this description proceeds, particularly when considered in connection with the attached drawings, wherein:

Figure 1 is a side elevation of a tractor and implement embodying the construction of the present invention.

Figure 2 is an enlarged side elevational view of the upper link assembly of the construction shown in Figure 1.

Figure 3 is a cross-sectional view taken on the line 3—3 of Figure 2.

Figures 4 and 5 are vertical cross-sectional views taken on the lines 4—4 and 5—5 respectively of Figure 2.

Figure 6 is a diagrammatic view of the rearward portion of a tractor and plow, incorporating conventional linkage, and with the plow operating at a normal depth.

Figure 7 is a diagrammatic view similar to Figure 6 and also incorporating conventional linkage, but showing the plow in a partially raised condition.

Figure 8 is a diagrammatic view similar to Figure 6 but incorporating the linkage of the present invention, and with the plow operating at a normal depth.

Figure 9 is a diagrammatic view similar to Figure 8 and incorporating the linkage of the present invention, but showing the plow in a partially raised position.

Figure 10 is a side elevational view, partially in section, of a modified construction.

Referring now to the drawings, and particularly to Figure 1, the reference character 10 indicates a tractor and the reference character 12 a three bottom plow. The tractor 10 comprises a tubular frame 14 supporting front and rear wheels 16 and 18 respectively. The plow 12 is conventional and comprises a beam 20 supporting plow shares 22, 24 and 26. An A-frame 28 is secured to the forward portion of the plow beam 20 and provides means for attaching the plow to the tractor.

A pair of transversely spaced lower links 30 are provided, each pivotally connected at its forward end to a side of the tractor frame 14 by means of a pivotal connection 32. The rearward ends of the lower links 30 are pivotally connected to the lower portion of the A-frame 28 of the plow by means of pivotal connections 34. The pivotal connections 32 and 34 are preferably ball joints for universal action. The lower links normally operate in tension as the implement is pulled by the tractor.

The reference character 36 indicates an upper link assembly comprising a pair of telescopically arranged links 38 and 40. As best seen in Figures 2 to 5, inclusive, the links 38 and 40 comprise flat members positioned adjacent each other for relative sliding movement. The link 38 is pivotally connected to a bracket 42 carried by the tractor by means of a ball joint 44 and a pivot pin 46 extending through the ball joint and through the bracket. The link 40 is similarly connected at its rearward end to the A-frame 28 of the plow by means of a ball joint 48 and a pivot pin 50 extending through the ball joint and the upper portion of the A-frame.

A U-shaped guide 52 has its legs 54 welded to the opposite edges of the link 40 adjacent the forward end of the latter, and embraces the forward portion of the link 38 to support and guide the latter. Sufficient clearance is provided between the guide 54 and the link 38 to permit free sliding movement therebetween. A similar guide 56 of U-shape is provided adjacent the rearward ends of the links and is formed with legs 58 welded to the opposite edges of the link 38. Guide 56 embraces and guides link 40 for free sliding movement relative to link 38.

Adjacent its rearward end the link 40 is formed with longitudinally spaced integral flanges or stops 60 and 62. The stops 60 and 62 extend the width of link 40 and are arranged in the path of movement of the U-shaped guide member 56 carried by link 38. It will be apparent that the stops 60 and 62 form abutments engaging the guide member 56 and limiting relative sliding movement between the links 38 and 40. In Figures 1, 2, 3 inclusive the guide member 56 is shown in engagement with abutment 62 so that the link assembly 36 is in its contracted position and the distance between the pivotal connections 46 and 50 on the tractor and implement respectively is a minimum. It will be apparent that the link assembly 36 may be extended until guide member 56 engages the forward abutment 60 at which time the distance between the pivotal connections 46 and 50 will be a maximum.

The links 38 and 40 forming the upper link assembly 36 are thus mounted for free unrestrained sliding movement with respect to each other throughout a predetermined range determined by the location of the abutments 60 and 62 and the width of the guide member 56. The upper link assembly is normally used in this manner and its operation will be made more apparent as this description proceeds. Under some circumstances, however, it may be desirable to fix the length of assembly 36, and for this purpose holes 64 and 66 are formed in the links 38 and 40 respectively and are arranged so as to be in alignment with each other when the links are in their contracted position as shown in Figures 2 and 3. Suitable pins can then be inserted through the aligned holes to lock the links together.

Referring again to Figure 1, the forward end of the extensible upper link assembly 36 is connected by means of the pivotal connection 46 to a bracket 42 which in turn is pivotally connected to the tractor frame at 68. A control rod 70 is connected at its rearward end to an intermediate portion of the bracket 42 and is arranged to actuate conventional hydraulic control mechanism (not shown). A coil spring 72 surrounds the control rod 70. When the tractor is being operated in conjunction with an implement such as a plow, the upper link assembly 36 is placed in compression and a force applied through the control rod 70 to the hydraulic control mechanism, which in turn controls lift arms 74 pivotally mounted at their forward ends on opposite ends of a cross shaft 76 rotated by the hydraulic lift mechanism. The outer ends of the lift arms 74 are connected by means of links 78 to intermediate portions of the lower links 30. It will be apparent that upon operation of the hydraulic lift mechanism to swing the lift arms 74 in a counter clockwise direction the lower links 30 will be swung about their pivotal connections 32 to the tractor frame, and the plow raised.

Reference is now made to Figures 6 to 9 inclusive for an explanation of the structure. Figures 6 and 7 illustrate a conventional tractor and plow utilizing conventional linkage in which the upper link 36' comprises a single link of fixed length pivotally connected at its forward end to the tractor and at its rearward end to the A-frame 28 of the plow.

Figure 6 illustrates the plow 12 working at a normal 7 inch depth, and it will be seen that the plow shares 22, 24 and 26 are substantially horizontal and in alignment with each other at this depth. When the hydraulic lift mechanism is operated a lifting force is applied through the links 78 to the lower links 30 to raise the plow. Figure 7 illustrates the conventional tractor with the plow in a partially raised position. The geometry of the upper and lower links 36' and 30 respectively, and their pivotal connections to the tractor and to the plow, result in raising the plow in such manner that the plow shares are tilted downwardly to increase their suck angle. In Figure 7 the forward plow share 22 is shown at approximately a three inch depth and it will be seen that the intermediate and rear plow shares 24 and 26 respectively have been raised progressively above the three inch depth line. The increased suck angle thus formed causes the plow shares to tend to dig deeper into the ground, and the hydraulic lift mechanism must thus lift not only the weight of the plow but must also overcome the increased suck. This normally has no serious consequences when the plow is a single bottom plow, but may cause undesirable operating characteristics when the plow is of the two or three bottom type. The larger plows are not only considerably heavier but also overhang the rearward portion of the tractor to a greater extent, and the lifting action thus results in a greater weight transfer from the front wheels of the tractor to the rear wheels thereof and in requiring a greater oil line pressure to produce the desired lifting action. In addition, the response may not be as prompt as desired and smoothness of operation may be impaired.

Figures 8 and 9 illustrate operating conditions comparable to Figures 6 and 7 respectively, but in connection with a tractor embodying the present invention and incorporating the extensible upper link assembly 36 previously described.

In Figure 8 the three bottom plow 12 is operating at a normal 7 inch depth, and it will be seen that the plow shares 22, 24 and 26 are generally horizontal and in alignment with each other at this depth. Figure 9 illustrates the position of the plow when the hydraulic lift mechanism is brought into action to apply a lifting force to the plow. As in Figure 7, the hydraulic lift mechanism has applied a lifting force through links 78 to the links 30 and hence to the A-frame 28 of the plow. The upper link assembly 36, having previously been in its contracted position while operating at a uniform depth, and being formed of a pair of relatively slidable links permitting unrestrained extension of the link assembly, automatically extends when a lifting force is applied to the lower links. This results in increasing the distance between the pivotal connections 46 and 50, and in tilting the A-frame 28 and the entire plow assembly rearwardly. The plow shares 22, 24 and 26 are consequently tilted in an upward fashion as shown in Figure 9 to form negative suck angles (or positive raising angles) with respect to the ground line.

Upon further reference to Figure 9 it will be seen that the rearward plow share 26 is substantially at the 7 inch depth, while the intermediate and forward plow shares 24 and 22 respectively are raised progressively above the 7 inch depth line. The plow shares thus form positive raising angles and consequently tend to automatically rise toward the ground line, thus assisting the hydraulic lift mechanism instead of adding an additional burden thereto. Only a portion of the relative movement between the upper links 38 and 40 has been utilized in the position shown in Figure 9, since normally a slight extension of the upper link assembly 36 is sufficient to produce the desired result. With this construction the hydraulic lift mechanism is not required to lift the entire implement to correct for a variation in draft but only need raise the forward portion of the implement. Consequently the response is immediate and the draft can be corrected with a relatively low oil line pressure and with less weight transfer from the front to the rear wheels of the tractor.

As previously mentioned, the guide member 56 carried by the forward upper link 38 is in engagement with the abutment 62 on the rearward upper link 40 when the tractor is in its normal operating condition and the upper link assembly is in compression. Operation of the hydraulic lift mechanism to raise the implement causes the rearward upper link 40 to move rearwardly and to separate the abutment 62 from the guide member 56. Only a small movement is necessary to change the suck angle of the plow shares and to effect the desired draft correction, and this is normally accomplished without bringing the forward abutment 60 into engagement with the guide member 56. When, however, it is desired to raise the implement completely from the ground to transport position to enable it to be carried from one location to another, the rear upper link 40 will be moved rearwardly until the front abutment 60 engages the guide member 56, and further extension of the upper link assembly will thus be prevented.

Extensible upper links, usually providing a definite restraint to extension, have heretofore been provided in connection with tractors of this type to prevent damage when obstacles are encountered. These constructions, however, cannot achieve the results of the present invention, in which the upper link assembly is extensible in a completely unrestrained manner, throughout a predetermined range, and is effective to cause a completely different mode of operation of the tractor and implement whenever the implement is raised by the hydraulic lift mechanism to correct the depth of the implement in the ground. The construction is thus immediately effective during each lifting action to operate in the manner described above.

While the invention has been shown in its principal embodiment as comprising a pair of relatively slidable upper links to form an extensible upper link assembly, it will be apparent that other constructions can be utilized to enable the distance between the upper portion of the plow A-frame 28 and the tractor frame 14 to be freely increased whenever the hydraulic lift mechanism is operated. One such variation is shown in Figure 10, in which the A-frame 70 secured to the plow (not shown) carries adjacent its upper end a pivot pin 72 which is slidably mounted within a slot 74 formed in the rearward end of an upper link 76. It will be apparent that when the plow is operating at a uniform depth the pin 72 will bear against the forward end of slot 74 to place the upper link 76 in compression and to maintain a minimum fixed distance between the pivot pin 72 and the pivotal connection of the forward end of link 76 to the tractor. When the hydraulic lift mechanism is operated, however, pin 72 is free to slide rearwardly in slot 74 in the upper link 76 to increase the above mentioned distance and to permit the plow A-frame 70 to tilt rearwardly and to change the suck of the plow shares in a manner similar to that shown in Figure 9.

It will be understood that the invention is not to be limited to the exact construction shown and described, but that various changes and modifications may be made without departing from the spirit and scope of the invention, as defined in the appended claim.

What is claimed is:

In combination, a tractor having upper and lower attachment means, a plow having upper and lower attachment means and having a plurality of longitudinally spaced plow shares, a pair of laterally spaced nonextensible lower links interconnecting the lower attachment means on said tractor and plow and pivotally attached thereto, power lift means on the tractor connected to one of said lower links to lift the latter and the plow, a first upper link pivotally connected at its forward end to the upper attachment means on said tractor, a second upper link pivotally connected at its rearward end to the upper attachment means on said plow and supported for free unrestrained sliding movement relative to said first upper link, stop means limiting the forward movement of said second upper link relative to said first upper link to space said upper attachment means on said tractor and said plow a predetermined minimum distance apart when said plow is in soil working position and said upper links are in compression to position said plow shares substantially in horizontal alignment when operating at a normal working depth, and other stop means associated with said first and second upper links to limit the rearward movement of said second upper link relative to said first upper link to space said upper attachment means a predetermined maximum distance apart when the plow is lifted out of engagement with the soil into transport position, the sliding movement of said second upper link rearwardly relative to said first upper link being unrestrained between the minimum and maximum positions defined by said stop means, the range of sliding movement between the first and second upper links being sufficient to enable the upper attachment means on the tractor and plow to be increased when the plow is initially lifted by said power lift means an amount sufficient to tilt said plow shares upwardly in a forward direction at the normal working depth to assist in raising the plow from the soil.

References Cited in the file of this patent

UNITED STATES PATENTS

| | | |
|---|---|---|
| 1,308,744 | Carpenter | July 1, 1919 |
| 2,273,875 | Livesey et al. | Feb. 24, 1942 |
| 2,294,188 | Kuntz | Aug. 25, 1942 |
| 2,405,980 | Sands et al. | Aug. 20, 1946 |
| 2,455,727 | Bunting | Dec. 7, 1948 |